United States Patent [19]
Polt

[11] Patent Number: 5,419,078
[45] Date of Patent: May 30, 1995

[54] MECHANICAL APPLICATOR FOR DISPERSING HERBICIDE

[76] Inventor: Paul Polt, 11514 Westmont Dr., Omaha, Nebr. 68138

[21] Appl. No.: 219,139

[22] Filed: Mar. 29, 1994

[51] Int. Cl.⁶ .............................................. A01M 7/00
[52] U.S. Cl. .......................................... 47/1.5; 47/1.7
[58] Field of Search ................ 47/1.7, 1.5; 56/121.42, 56/130, 127

[56] References Cited

U.S. PATENT DOCUMENTS

| Re. 26,166 | 3/1967 | Inhofer | 47/1.7 |
|---|---|---|---|
| 1,467,415 | 9/1923 | Bailey | 56/121.42 |
| 2,682,132 | 6/1954 | Marihart | 47/1 |
| 2,988,849 | 6/1961 | Laughlin | 47/1.5 |
| 3,002,319 | 10/1961 | Laughlin | 47/1.5 |
| 4,347,684 | 9/1982 | Keeton | 47/1.5 |
| 4,677,787 | 7/1987 | Said | 47/1.5 |
| 4,748,769 | 6/1988 | Kolskog et al. | 47/1.5 |
| 4,908,981 | 3/1990 | Moore | 47/1.5 |

FOREIGN PATENT DOCUMENTS

| 890465 | 2/1944 | France | 56/121.42 |
|---|---|---|---|
| 1032433 | 7/1953 | France | 56/121.42 |
| 1123262 | 2/1962 | Germany . | |
| 812732 | 4/1959 | United Kingdom . | |

*Primary Examiner*—Henry E. Raduazo
*Attorney, Agent, or Firm*—Zarley, McKee, Thomte, Voorhees & Sease; Dennis L. Thomte

[57] ABSTRACT

A herbicide disperser for selectively controlling unwanted weeds without killing the desired grasses. The apparatus includes a central frame generally transversely disposed with a pair of rear wheels and a front wheel for mobilization. The frame has a herbicide storage tank mounted to it, tubular handles for manual pushing and a forward and rearward series of spring tines which aid in guiding the unwanted weeds upwards to a wick assembly which saturates the unwanted weeds with herbicides. The tines are able to distinguish between the desired grasses and the unwanted weeds in that the unwanted weeds are longer and are picked up by the rearward tines and guided to the wick assembly and the desired grasses are passed over.

12 Claims, 6 Drawing Sheets

MECHANICAL APPLICATOR FOR DISPERSING HERBICIDE

BACKGROUND OF THE INVENTION

The invention relates to new and useful mechanical devices and methods for dispersing herbicide to selected unwanted plants without affecting desirable grasses and vegetation. Conventional mechanical herbicide dispersers and distributors operate by spraying herbicide downward from the distributor onto a large area which often results in desirable grasses being sprayed and killed. This typically leaves a spot in the grass which later must be reseeded. Spraying herbicides by conventional methods may also result in the soil becoming saturated which sterilizes the soil and prevents growth of any kind for a long period of time.

Another disadvantage associated with conventional spray methods is that on windy days the spray gets diverted and adjacent grasses and vegetation become affected.

SUMMARY OF THE INVENTION

With these problems in mind, the present invention overcomes these disadvantages by providing a herbicide sprayer which is effective in disposing herbicide without affecting peripheral vegetation, the soil, and can be effectively operated in windy conditions.

Thus, the primary object of the present invention is to provide a herbicide disperser which applies herbicide to unwanted weeds without affecting desirable grasses around them.

Another object of the invention is to provide a device for selectively segregating unwanted weeds from desired grasses and elevating the undesired weeds to a wick assembly which saturates the weeds with herbicides.

Still another object of the invention is to provide a herbicide disperser which can be operated on windy days without the herbicide affecting peripheral vegetation.

Yet another object of the invention is to provide a herbicide disperser which does not saturate the soil with herbicide.

And still another object of the present invention is to ensure that the application of herbicide to unwanted weeds does not result in "dead spots" in the grass which must later be reseeded.

These and other objects of the present invention will be apparent to those skilled in the art.

DETAILED DESCRIPTION OF THE PREFERRED EMBODIMENT

Figure 1:
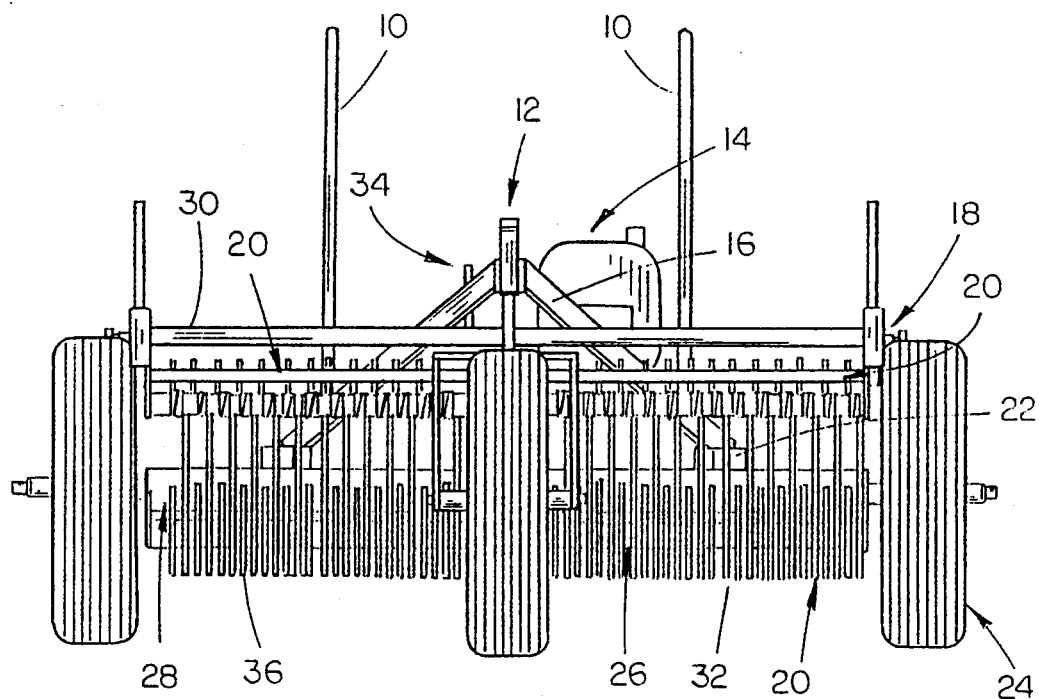
FIG. 1 is a frontal view of the herbicide dispenser showing the forward section of the wheeled frame with its forward and rearward tines.
Figure 2:
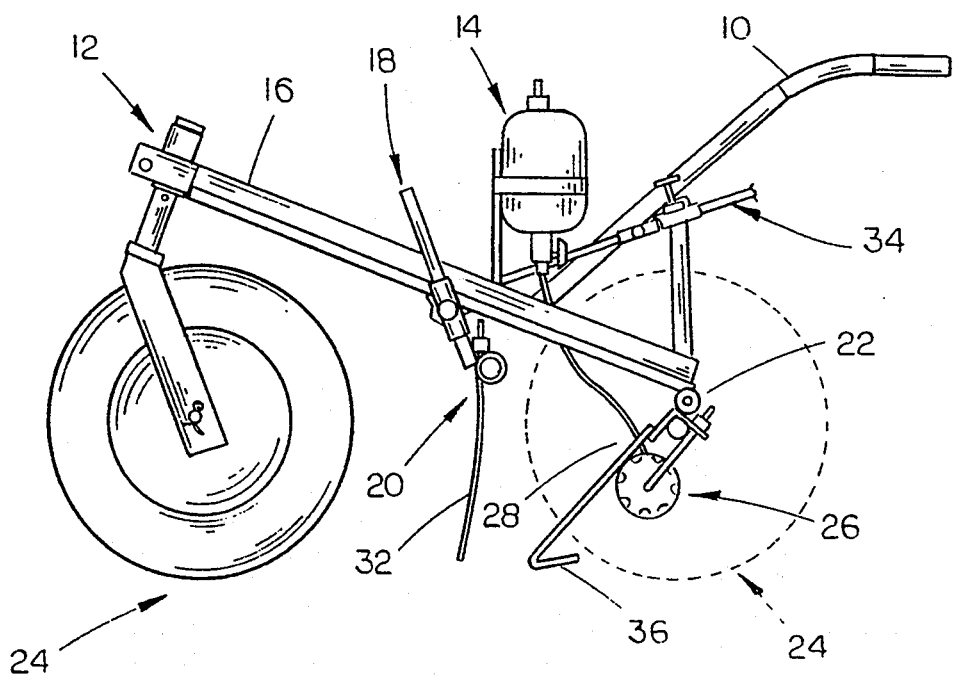
FIG. 2 is a side view of the herbicide dispenser shown in FIG. 1.

Referring to FIGS. 1 and 2, the numeral 10 refers to a pair of handles for manually pushing the herbicide dispenser, which is referred to generally by the reference numeral 11. The herbicide dispenser is designed for either manual pushing or being towed by a vehicle. A front tine primary support frame 30 helps support front tine assembly 20 which extends transversely across the primary mechanical support frame 16. Front tine primary support frame 30 also helps support wick assembly 26 which saturates weeds with herbicide. Tank 14 dispenses herbicide to wick assembly 26.

Reference numeral 12 shows the front wheel assembly and hitch device which pivots for easy turning. Primary support frame 16 is used to attach other components together to form one machine. Reference numeral 18 refers to the adjustment mechanism for the front spring tine assembly 20, which is used to adjust the front set of spring tines 20 closer to or further from the rear tine assembly 28, and closer to or further from the ground. Reference numeral 22 shows the hinge that is used between primary mechanical support frame 16 and the rear tine assembly 28, which allows the rear tine assembly 28 to pivot.

Reference numeral 24 shows the rear wheel and axle assembly which carries the rear of the machine. Numeral 30 refers to the front tine adjustment system primary support that is used to attach the front tine assembly 32 to the primary mechanical support frame 16. The front spring tines 32 are placed across the entire front tine assembly 20 and the rear tine adjustment system 34 adjusts the rear tine assembly 28, which moves rear tines 36 closer to or further from the ground.

Figure 7:
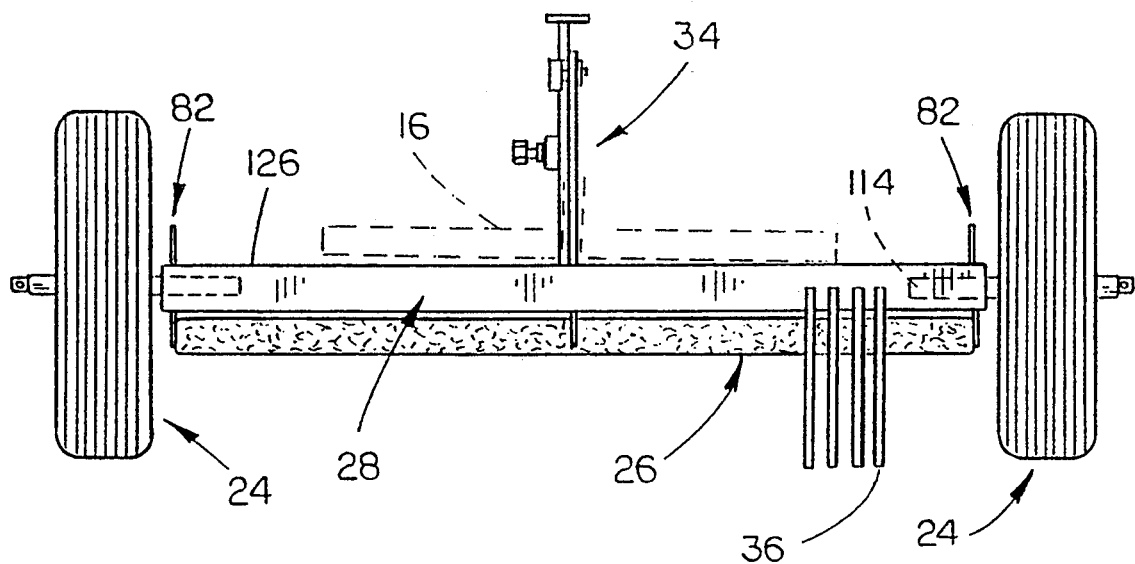
FIG. 7 is a rear view showing the rearward section of the wheeled frame with its rearward tines.

The rear tine assembly 28, as shown in FIG. 7, is made up of individual tines 36 extending downwardly towards the ground. The rear tine assembly 28 is located just above the wick assembly 26. As stated previously, the rear tine adjustment mechanism 34 allows for adjustment of the assembly closer to or further from the ground. The wick assembly 26 is attached to the rear fine assembly 28 by wick mounting bracket assembly 82. Rear wheels 24 attach to the rear tine assembly 28 by axle shaft 114.

Figures 3, 3A:
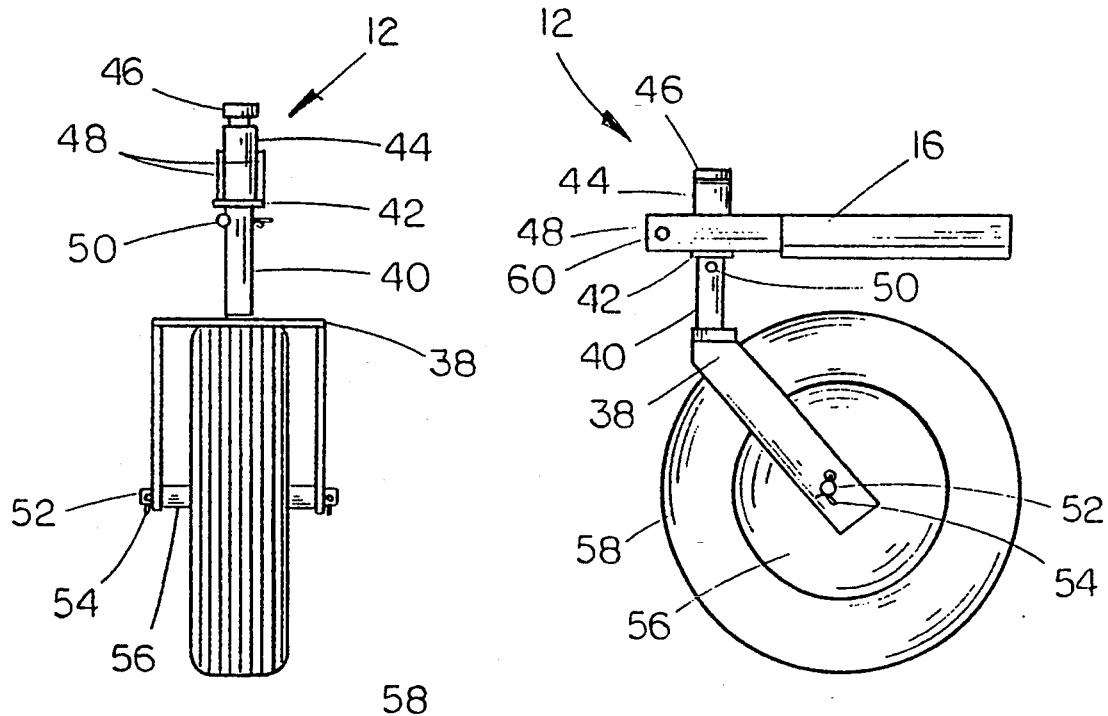
FIG. 3 is a frontal view of the front wheel and axle assembly.
FIG. 3A is a side view of the front wheel and axle assembly of FIG. 3.
Figure 3B:
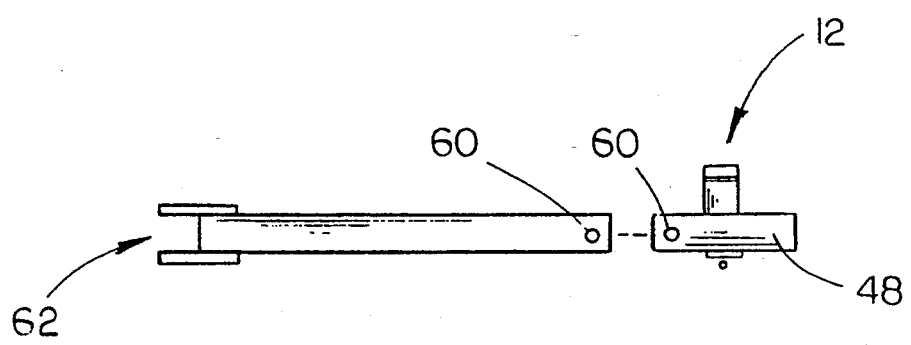
FIG. 3B is a side view of an optional tongue assembly for pulling the herbicide disperser behind motorized vehicles.
Figure 4:
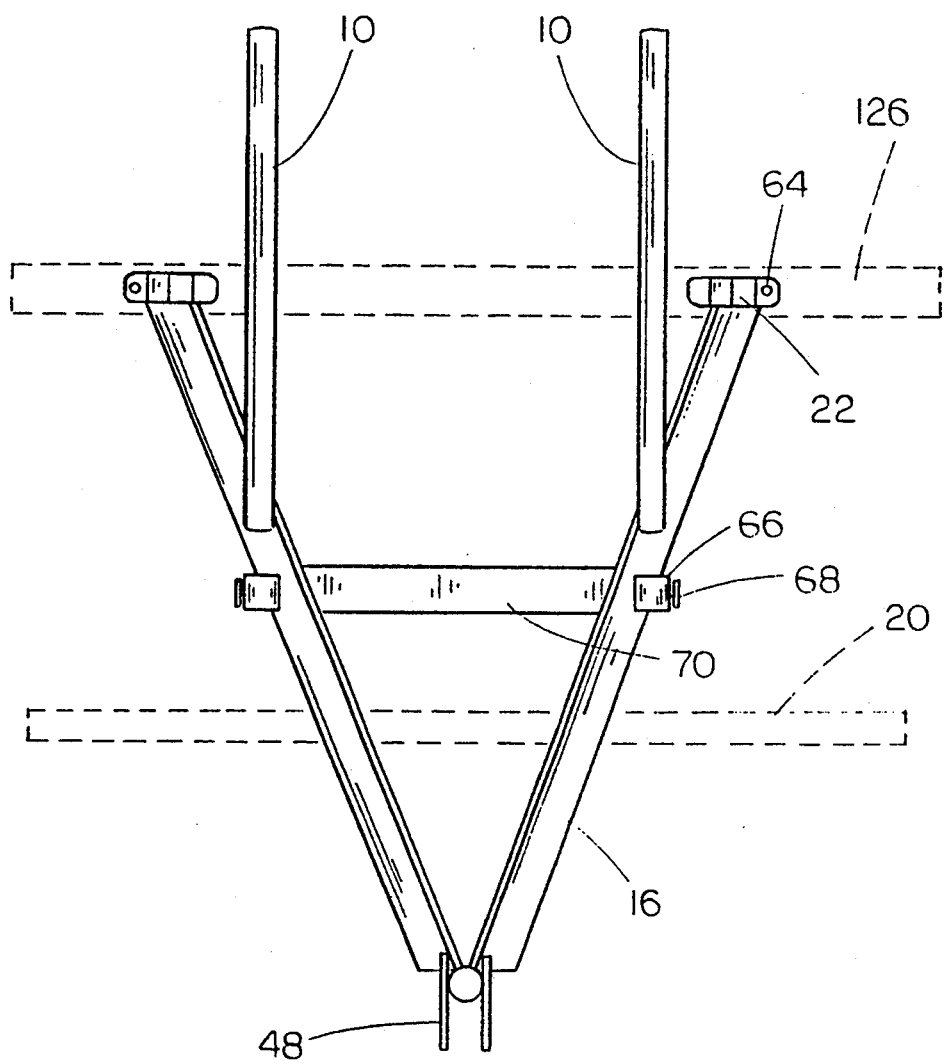
FIG. 4 is a plan view of the frame assembly of the herbicide disperser.
Figure 4A:
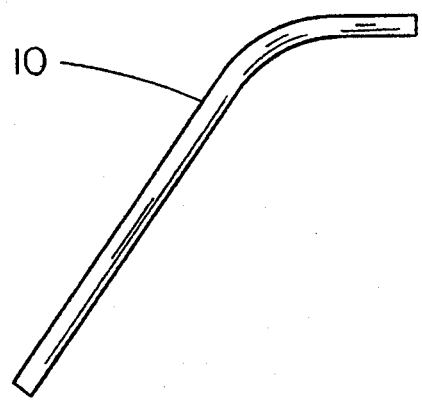
FIG. 4A is a side view of the handles used in pushing the herbicide disperser.

Illustrated in FIG. 3, the numeral 12 generally refers to a front wheel assembly while the numeral 58 refers to the front wheel of the mechanized herbicide dispenser. Front wheel 58 is attached to the front axle 52 by the self-contained hub with bearing 56, and the axle pin 54. Extending upwardly from the front axle is front axle support fork 38 and pivoting wheel mechanism 40. A pin 50 is inserted in the pivoting wheel mechanism 40. Primary support frame 16 attaches to the front wheel assembly 12 in-between washer 42, collar 44, cap 46, and tongue device 48. FIG. 3B shows optional tongue assembly 62 which is used for pulling the disperser behind a vehicle which is comprised of tongue device 48 which attaches to the main body of the assembly by pre-drilled hitch attachment hole 60.

Rear tine assembly support 126 attaches to the primary mechanical support frame 16 by hinge 22 and hinge locking pin 64. The handles 10 attach to collar 66 and handle lock 68. The primary mechanical support frame 16 is secured by main frame support brace 70.

Figure 5:
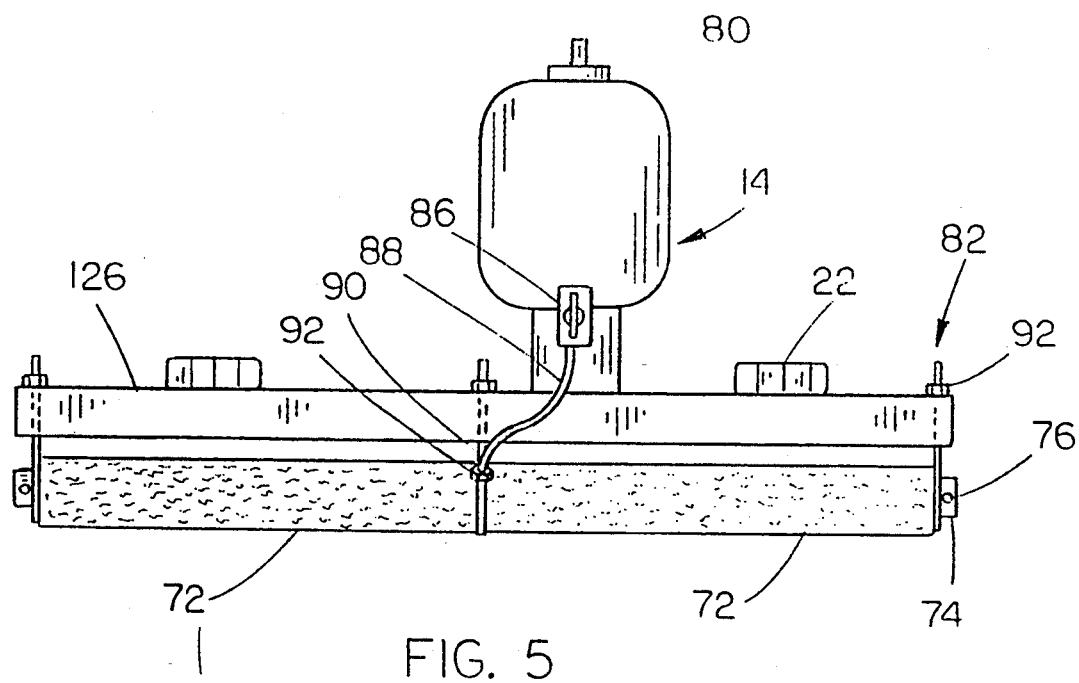
FIG. 5 is a rear view of the frame assembly showing the plastic tank on a mounting bracket.

Referring specifically to FIG. 5, fill spout and breather tube 80 is positioned above herbicide tank 14 which has perforated tubing 88 which extends to the wick absorbent applicator 72. The perforated tubing 88 is attached to the tanks by a connector with a shut-off valve 86 which extends down to a threaded rod 90 and a locking nut 92.

Figure 5A:
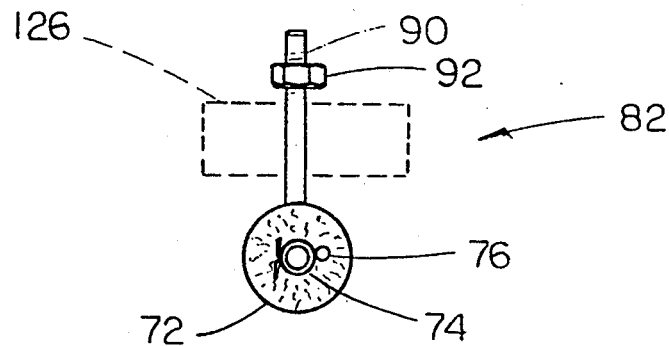
FIG. 5A is a side view of the mounting bracket in the rear tine assembly support.

FIG. 5A shows a detailed view of the mounting bracket, referred to generally at 82, with the wick absorbent applicator 72 and plastic support pipe 74 with pin 76.

Figure 5B:
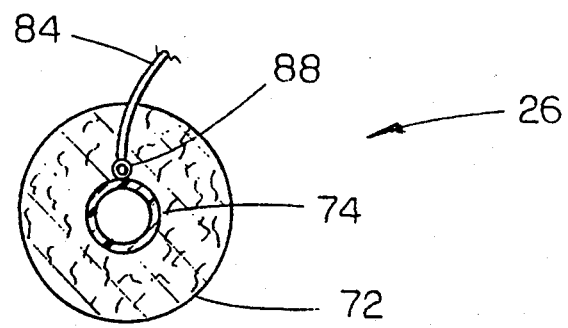
FIG. 5B is a side perspective of the wick assembly.

A detailed view of the wick assembly 26 is shown in FIG. 5B which also shows plastic tubing 84 and perforated tubing 88.

Figure 6:
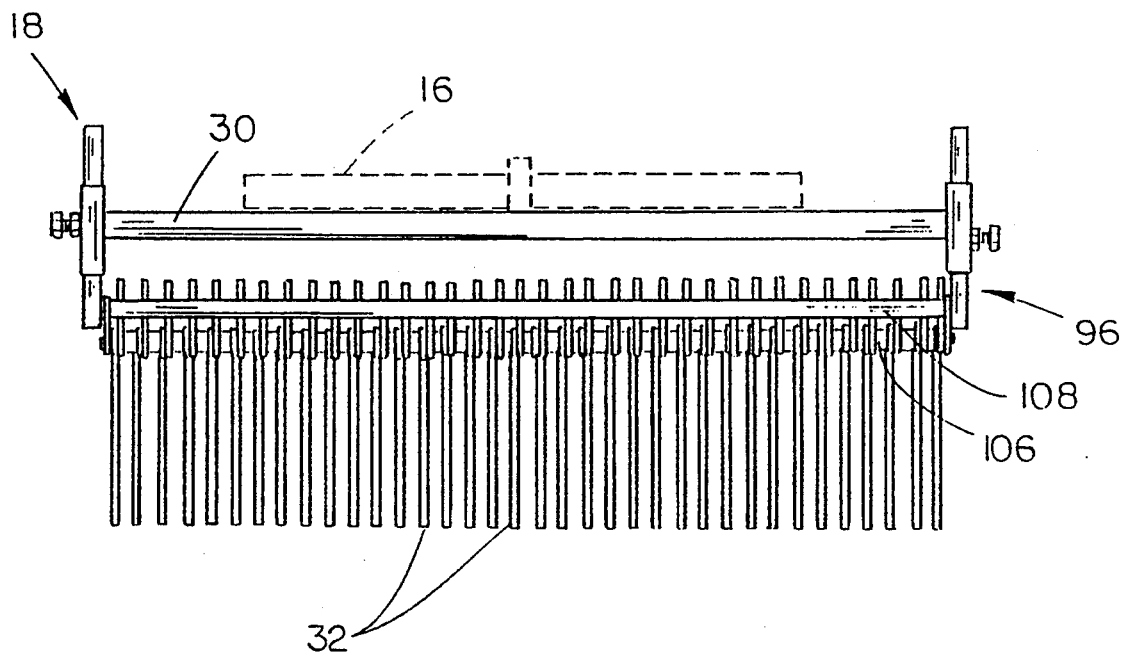
FIG. 6 is a frontal view of the forward tines and the forward tine shaft.

The front tines 32 can be adjusted by the adjusting rod 96. There is also a front tine adjustment system primary support 30 for further tine adjustment. FIG. 6 shows the front set of tines 32 and adjustment mechanism 18. Also illustrated is tine locking tube 108 with tine support shaft 106.

Figure 6A:
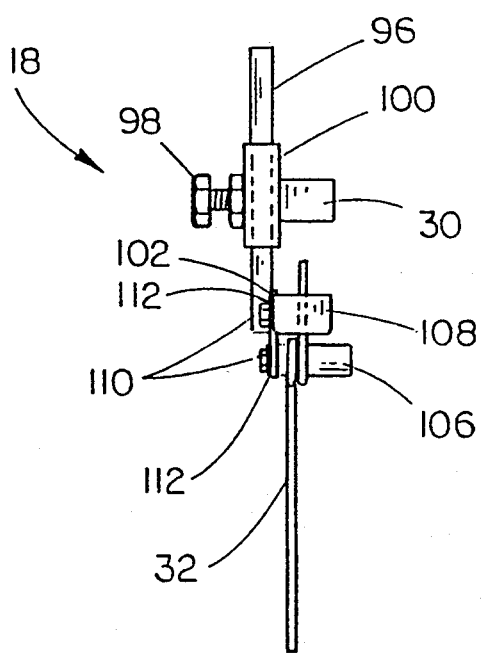
FIG. 6A is a detailed view of a tine and front tine adjustment mechanism shown in FIG. 6.
Figure 6B:
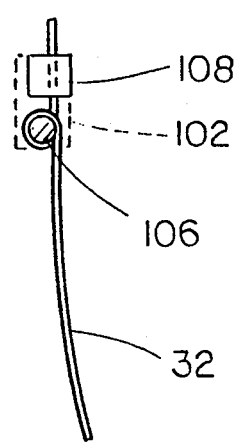
FIG. 6B is a side view of a tine as shown in FIG. 6A.

Referring to FIG. 6A, a detailed view of the adjustment mechanism for the front set of tines 18 shows the tine support shaft 106 and the tine locking tube 108 with attaching bolt 110 and washer 112. Attached to the tine locking tube 108 is attachment plate 102. Adjustment locking bolt 98 locks the front tine adjustment system primary support 30, and adjusting rod 96 is asserted through the adjustment rod sleeve 100.

Figure 7A:
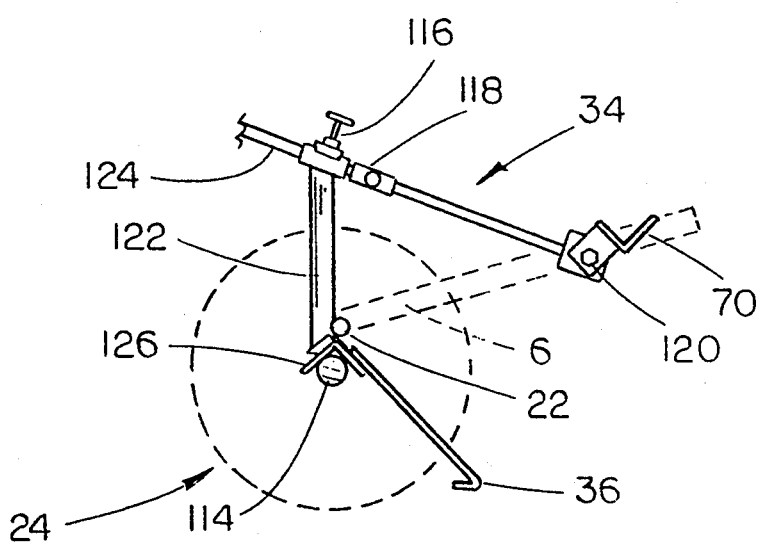
FIG. 7A is a side view of the rear tine assembly adjustment mechanism.

FIG. 7A shows a side view of the rear tine assembly adjustment mechanism 34 which shows adjusting rod 124 which is controlled by the adjustment rod locking bolt 116 and the adjustable slide stop collar 118. The adjusting rod 124 is supported by the support bracket 122. The rear frame is controlled by the attachment bolt and lock nut device 120 and main frame support brace 70. The rear tine 36 is supported by the rear tine assembly support 126 which is located above the axle shaft 114.

The mechanical applicator for dispersing herbicide operates on the premise that typically, most unwanted grasses and weeds grow faster than the desired grasses and the leaves of the unwanted grasses are disposed horizontally above the desirable grasses. As the machine is pulled or pushed across the ground, the front tine assembly 20, with the individual spring tines 32, pass over the vegetation and divide the vegetation in rows between the tines. As the leaves of the weeds pass through the individual front spring tines 32, the leaf gets caught in the individual rear tines 35 while the desired grasses get passed over. The rear tines 35 then guide the longer leaves up into the wick assembly 26, which coats the leaf with herbicide which is supplied from tank 14. The herbicide then subsequently kills the unwanted weed or grass.

I claim:

1. A mechanized herbicide disperser comprising,
   a wheeled frame having a forward end, a rearward end, and opposite sides,
   a forward set of tines mounted on said forward end of said wheeled frame,
   a rearward set of tines mounted on said rearward end of said wheeled frame, each of said sets of tines being mounted about a horizontal axis parallel to the transverse axis of said wheeled frame and perpendicular to the direction of travel thereof, with said tines descending towards the ground,
   said wheeled frame having a wick applicator mounted thereto for receiving herbicide or the like and for application of said herbicide or the like to unwanted weeds or other vegetation,
   said wheeled frame having a herbicide tank mounted therein for holding herbicide or the like and for distributing said herbicide or the like to said wick applicator.

2. The assembly of claim 1 with said wick applicator consisting of an elongated cylindrical wick absorber with opposite ends mounted about a horizontal axis parallel to the transverse axis of said wheeled frame and perpendicular to the direction of travel thereof,
   said wick applicator mounted with each end of said wick applicator in a mounting bracket with said mounting brackets located at said opposite sides of said wheeled frame.

3. The assembly of claim 2 with said wick applicator being mounted below a rear tine assembly support and above said rearward set of tines.

4. The assembly of claim 3 wherein said rearward set of tines passes over the shorter leafed desired vegetation and guides the longer leafed weeds or undesired vegetation upwards to said wick applicator which saturates said weeds or the like with herbicide.

5. The assembly of claim 1 wherein said herbicide tank is mounted above said rearward end of said wheeled frame.

6. The assembly of claim 1 wherein said rearward end of said wheeled frame has a pair of handles for pushing said wheeled frame.

7. A mechanized herbicide disperser comprising,
   a wheeled frame having a forward end, a rearward end, and opposite sides,
   a forward set of tines mounted on said forward end of said wheeled frame,
   a rearward set of tines mounted on said rearward end of said wheeled frame, each of said sets of tines being mounted about a horizontal axis parallel to the transverse axis of said wheeled frame and perpendicular to the direction of travel thereof, with said tines descending towards the ground,
   said wheeled frame having a wick applicator mounted thereon for receiving herbicide or like and for application of said herbicide or the like to unwanted weeds or other vegetation,
   said wheeled frame having a herbicide tank mounted thereon for holding herbicide or the like and for distributing said herbicide or the like to said wick applicator,
   a rear tine adjustment system for adjusting said rearward set of tines, and
   a forward tine adjustment system for adjusting said forward set of tines.

8. The assembly of claim 7 with said wick applicator consisting of an elongated cylindrical wick absorber with opposite ends mounted about a horizontal axis parallel to the transverse axis of said wheeled frame and perpendicular to the direction of travel thereof, said wick applicator mounted with each end of said wick applicator in a mounting bracket with said mounting brackets located at said opposite sides of said wheeled frame.

9. The assembly of claim 8 with said wick applicator being mounted below a rear tine assembly support and above said rearward set of tines.

10. The assembly of claim 9 wherein said rearward set of tines passes over the shorter leafed desired vegetation and guides the longer leafed weeds or undesired vegetation upwards to said wick applicator which saturates said weeds or the like with herbicide.

11. The assembly of claim 7 wherein said herbicide tank is mounted above said rearward end of said wheeled frame.

12. The assembly of claim 7 wherein said rearward end of said wheeled frame has a pair of handles for pushing said wheeled frame.

* * * * *